(12) United States Patent
Abdi (10) Patent No.: US 12,088,354 B2
(45) Date of Patent: Sep. 10, 2024

(54) HIGH SPEED ACOUSTIC COMMUNICATIONS AND TELEMETRY VIA SOLID PIECES

(71) Applicant: Ali Abdi, Short Hills, NJ (US)

(72) Inventor: Ali Abdi, Short Hills, NJ (US)

( * ) Notice: Subject to any disclaimer, the term of this patent is extended or adjusted under 35 U.S.C. 154(b) by 716 days.

(21) Appl. No.: 17/269,723

(22) PCT Filed: Aug. 20, 2019

(86) PCT No.: PCT/US2019/047317
§ 371 (c)(1),
(2) Date: Feb. 19, 2021

(87) PCT Pub. No.: WO2020/041351
PCT Pub. Date: Feb. 27, 2020

(65) Prior Publication Data
US 2021/0306080 A1 Sep. 30, 2021

Related U.S. Application Data

(60) Provisional application No. 62/765,301, filed on Aug. 20, 2018.

(51) Int. Cl.
| | |
|---|---|
| *H04B 11/00* | (2006.01) |
| *E21B 47/16* | (2006.01) |
| *G01L 1/22* | (2006.01) |
| *G01P 15/18* | (2013.01) |

(52) U.S. Cl.
CPC .............. *H04B 11/00* (2013.01); *E21B 47/16* (2013.01); *G01L 1/22* (2013.01); *G01P 15/18* (2013.01)

(58) Field of Classification Search
CPC .......... E21B 47/12; E21B 47/14; E21B 47/16; H04B 11/00; G01L 1/22; G01P 15/18
See application file for complete search history.

(56) References Cited

U.S. PATENT DOCUMENTS

| | | | | |
|---|---|---|---|---|
| 5,128,901 A | * | 7/1992 | Drumheller | E21B 47/16 340/854.3 |
| 8,060,311 B2 | * | 11/2011 | Ramshaw | E21B 44/00 73/152.55 |
| 8,193,946 B2 | * | 6/2012 | Sinanovic | E21B 47/16 367/82 |
| 8,284,075 B2 | * | 10/2012 | Fincher | E21B 47/14 290/1 R |
| 9,605,535 B2 | * | 3/2017 | Logan | E21B 47/18 |
| 11,549,368 B2 | * | 1/2023 | Van Zelm | E21B 47/14 |

* cited by examiner

*Primary Examiner* — Franklin D Balseca
(74) *Attorney, Agent, or Firm* — Fox Rothschild LLP (57) ABSTRACT

A method and a system are disclosed for high speed acoustic transmission of data in networks and sequences of solid pieces using various propagation modes. The data is converted to several sets, and then the sets are transmitted via propagation modes such as extensional or flexural or torsional or their combinations, using multiple transmitters. This allows to increase transmission rate or reduce transmission error or both for data communication.

20 Claims, 8 Drawing Sheets

HIGH SPEED ACOUSTIC COMMUNICATIONS AND TELEMETRY VIA SOLID PIECES

CLAIM OF PRIORITY

This application is the U.S. national phase of PCT Application No. PCT/US2019/047317 filed on Aug. 20, 2019, which claims a priority to U.S. Application 62/765,301 filed on Aug. 20, 2018, the contents of which are herein fully incorporated by reference in their entirety.

STATEMENT REGARDING FEDERALLY SPONSORED RESEARCH

This invention was made in part with government support under Award No. 1340415 awarded by the National Science Foundation. The government has certain rights in the invention.

FIELD OF THE EMBODIMENTS

The present disclosure relates to data communications and telemetry. In particular, the present disclosure relates to high speed communications and telemetry via solid pieces.

BACKGROUND OF THE EMBODIMENTS

Networks of solid pieces, such as, but not limited to, pipes, ducts, or tubings, appear in several applications. For drilling operations in the oil and gas industry, many pipes are connected via couplings to form a very long drill string in boreholes. Boreholes are typically very deep, with some running several thousand feet or more into the ground. During the drilling process, real-time transmission of important data from downhole to the surface and thru the pipe network, i.e., the drill string, is of high importance. The data could include temperature, pressure, torque, drilling direction, humidity, etc. Such data allows the driller to closely monitor the process, change the drilling direction, adjust the drilling speed, etc., to minimize the failure chance of the costly operation and machines. As such, the drilling process requires effective communication between the downhole equipment and the surface, through the pipe network.

In addition to drill strings in oil and gas wells, other examples of connected networks of solid pieces include production tubings and coiled tubings. Underground pipes in water supply systems form networks of pipes as well. Underground electric transmission lines such as, but not limited to, high-pressure fluid-filled pipes or high-pressure gas-filled pipes containing high-voltage conductors are one more example of a network of pipes.

Pipelines running in various sections and tunnels of underground mines form networks of solid pieces that can be used for communication. Imagine the roof has collapsed behind a working stope and mineworkers are trapped in a dead-end area of the mine. The existing communication technologies such as radios, Wi-Fi and wired telephones can easily break, when their cables and wirings, which are usually installed on the ceiling, are cut off. However, the likelihood of breaking steel pipelines is much less than that of other wirings. The invention disclosed herein offers a new method and system of communication via pipelines, to add another level of communication for emergency and non-emergency situations. In general, communication of mineworkers inside mines and with outside workers is of high importance for safe and efficient operation of mines. Typically, there are several communication technologies and methods available such as wired phones and Wi-Fi modems. However, existing solutions that are helpful under normal conditions may fail to operate during emergencies, due to various reasons such as collapsed roofs, broken cables, or power outage. To maximize the likelihood of survival of mineworkers under unusual and life threatening conditions, the disclosed invention presents a new technology and new communication devices. Communication range of the radio wave-based technologies can be limited due to wireless propagation of electromagnetic radio waves which causes signal attenuation, when passing through collapsed walls, rocks and the earth. The invention offers a different and new technology that utilizes existing pipelines in mines as the medium for communication, which has much less likelihood of failure during catastrophes. The invention can be used under non-emergency scenarios as well.

Another example relates to networks of air ducts in mines and buildings for ventilation and other purposes.

Acoustic communication and telemetry among devices and sensors in such systems and through sequences of solid pieces, e.g., connected pipes, ducts or tubings, are of interest (as a side note, acoustic waves are mechanical waves, which in turn are vibrations of matter). Acoustic communication and telemetry transmit acoustic waves through the solid pieces. While the use of acoustic communication and telemetry is desirable, the received signal in such systems often does not correspond to the transmitted signal. This behavior could be attributed to reflections of the transmitted signal. Additionally, in networks of solid pieces, such as drill strings in oil and gas wells, only one data stream is transmitted using a single transmitter. This limits the maximum achievable rate for communication and telemetry.

It would be desirable to improve the speed of transmission of information in networks and sequences of solid pieces.

SUMMARY OF THE EMBODIMENTS

In accordance with embodiments of the present disclosure, a method and a system are disclosed for high speed transmission of information in networks and sequences of solid pieces. In one embodiment, information is converted into several sets, and then the sets are transmitted simultaneously using multiple transmitters (In other embodiments, the information and/or the sets may be pre-processed, and/or may be transmitted at different times, using multiple transmitters). With the use of multiple transmitters, more than one signal or data can be transmitted simultaneously. This reduces the transmission time and increases the transmission rate.

Any combination and/or permutation of the embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed system and method for high speed transmission of information in networks, reference is made to the accompanying figures, wherein:

FIG. 14 is a drawing showing some exemplary ways of mounting one or more transmitters, such as, but not limited to, transducers and actuators, on a pipe. In the left drawing, a U-bolt is used to mount at least one transmitter. In the middle drawing, at least two transmitters are sandwiched between two cone-shaped holders, with the holders surrounding and attached to the pipe. Exemplary linear smooth transition of the cross section of each holder helps with better and more efficient transmission of signals and vibrations from the transmitters to the pipe. The right drawing is another exemplary way of mounting at least two transmitters, where cross-sections of the two holders change in a non-linear manner. The two holders in a holder pair do not need to have the same shape and do not need to be made from the same materials. Another exemplary way to mount transmitter(s) is to place the exemplary stacks of piezoelectric or piezoceramic disk segments, shown in FIG. 2, between an exemplary holder pair shown in FIG. 14.

DETAILED DESCRIPTION OF THE EMBODIMENTS

Exemplary embodiments are directed to a method and a system for high speed transmission of information in networks and sequences of solid pieces. Although discussed herein with respect to embodiments of a pipe setup, it should be understood that the present invention is not limited to these examples and various types of networks and systems and setups and infrastructures can benefit from the high-speed acoustic communication and telemetry invention.

Figure 1:
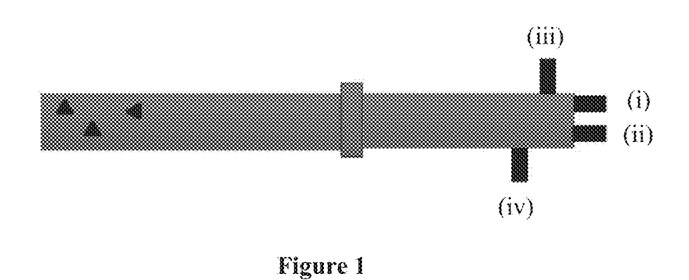
FIG. 1 shows an exemplary representation of a network of solid pieces through which data or signals or information can be communicated, in accordance with one embodiment of the present disclosure.

FIG. 1 shows an exemplary setup comprising two pipes connected via a coupling, also known as a tool joint. It should be understood that the lengths of the pipes could vary. In one embodiment, the lengths of the pipes can be different. It should be understood that the number of pipes and couplings could vary. In one embodiment, there can be more than two pipes and more than one coupling in the setup. In one embodiment, the pipes and the couplings are formed from the same material. However, materials of the pipes can be the same or different. Likewise, materials of the couplings can be the same or different. Shapes and geometries of the pipes can be the same or different. Shapes and geometries of the couplings can be the same or different. The cross sections of the pipes are not limited to be circular. Also, the pipes do not need to be hollow. There might be only one single pipe with no coupling. Pipes can be buried under, can be on a surface or ground, or can be hung or suspended from a ceiling or wall.

Referring to FIG. 1, one or more acoustic transducers or transmitters or electromechanical transducers (depicted symbolically by black rectangles) are employed in one embodiment. They serve to transmit data or signals or information of interest by converting them to sound or mechanical vibrations. While four transmitters are shown in FIG. 1, it will be understood that number of transmitters could vary.

The labels (i)-(iv) in FIG. 1 and their combinations show some exemplary positions for the acoustic transmitters. The acoustic transmitters can be placed or mounted in certain ways on various positions on each pipe or coupling, generating various types of waves such as, but not limited to, extensional (also known as longitudinal, axial, compressional), or flexural (also known as lateral, bending, transversal), or torsional, or their combinations. For example, transmitters (i) and (ii) generate extensional waves and transmitters (iii) and (iv) generate flexural waves. The acoustic transmitters could be the same or different from each other.

Figure 2:
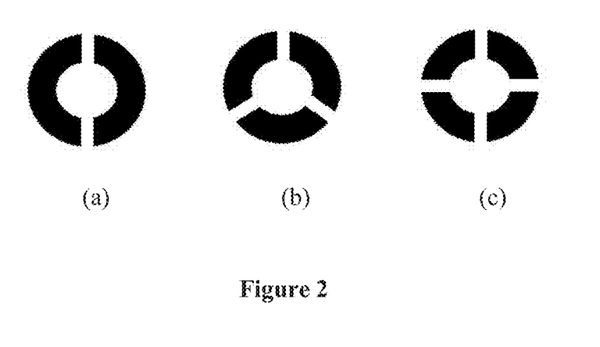
FIG. 2 shows top views of exemplary configurations of stacks of piezoelectric or piezoceramic disk segments depicting more than one transmitter.

In one embodiment, a stack of piezoelectric or piezoceramic disks or washers is used as one transmitter. FIG. 2 shows exemplary configurations of stacks of piezoelectric or piezoceramic disks or washers depicting two or more transmitters. With the use of multiple transmitters in the embodiments shown in FIG. 2, more than one signal or data can be transmitted simultaneously. Top views of stacks of piezo disk segments are shown in FIG. 2, where each black segment shows the top view of one stack acting as one transmitter. Using the disclosed method and system and the disclosed exemplary transmitters configurations labeled by (a)-(c) in FIG. 2, transmission rate can be doubled or tripled or quadrupled, respectively.

Other advantages of having multiple transmitters are the feasibility of using space-time, space-frequency, and space-time-frequency codes to improve reliability, i.e., reduce possible transmission errors. While the arc lengths of the black segments in each exemplary configuration in FIG. 2 are the same in one embodiment, the arc lengths of the black segments in each exemplary configuration of FIG. 2 could be different.

The transmitters are not limited to piezoelectric or piezoceramic disks or materials, and other transmitters or actuators or electromechanical transducers built using other technologies or made of other materials can be used, e.g., magnetostrictive materials. Transducers can be, but are not limited to, capacitive, inductive, or combinations thereof.

In the embodiment shown in FIG. 1, one or more sensors are provided on the other end of the setup (depicted symbolically by black triangles). The sensors receive the transmitted data or signals or information. Some examples of sensors are uni-axial and multi-axial, e.g., tri-axial, accelerometers, and strain sensors. Other sensors types are, but not limited to, displacement sensors, velocity sensors, stress sensors, force sensors, and electromechanical transducers, built using various types of technologies. The sensors do not need to be the same or to be placed at equal distances or at the same directions.

In one embodiment, the system could include a controller in communication with the acoustic transmitters or sensors. The controller could receive at least one process parameter, process the at least one process parameter, and adjust operation of the system based upon processing of the at least one process parameter.

Figure 3:
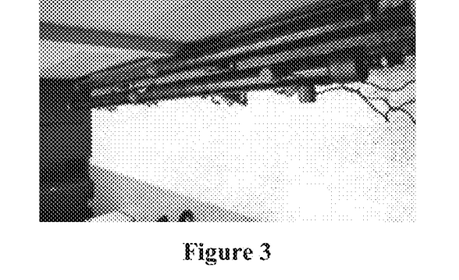
FIG. 3 is a photograph showing an exemplary pipe setup, which includes two pipes connected via a coupling.
Figure 4:
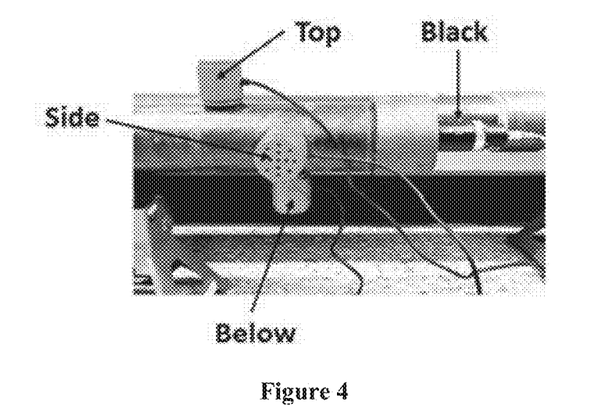
FIG. 4 is a close-up view of one end of the pipe setup of FIG. 3, showing an exemplary mounting of four transmitters on the right end of a pipe string for high speed communication through the pipes.
Figure 5:
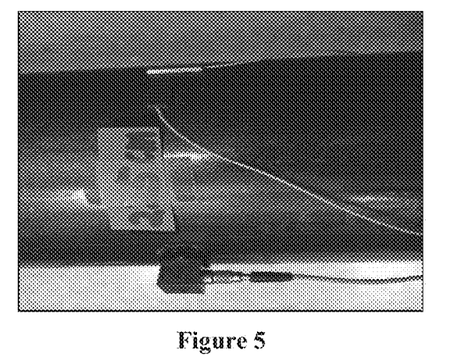
FIG. 5 is a close-up view of the opposite end of the pipe setup of FIG. 3, showing an exemplary mounting of three sensors on the left end of a pipe string as receivers for high speed communication through the pipes.

FIGS. 3 to 5 show one embodiment of a pipe setup. In particular, FIG. 3 shows two steel pipes, each 1.5 m long in this embodiment, connected using a coupling. Transmitters are mounted on the right end of the pipe string, whereas receiving sensors are mounted on the other end. FIG. 4 is a close-up view, showing four transmitters mounted on the right end of the pipe string. FIG. 5 is a close-up view, depicting three sensors on the left end. In this embodiment, two of the sensors are strain sensors and the other sensor is a tri-axial accelerometer.

If there is one set of data, for example 1000 binary digits 0 and 1, the set can be transmitted using only one transmitter of FIG. 4. However, to double the transmission rate, in an exemplary implementation of the invention, the set of 1000 bits can be divided into two smaller sets called data1 and data2, each having 500 bits. Then two transmitters shown in FIG. 4 can be selected, one of the transmitters to transmit data1 and the other transmitter to transmit data2. The use of two transmitters doubles the transmission rate.

For the pipe string shown in FIG. 3, to find out which two transmitters provide the best communication performance, i.e., the smallest bit error rate (BER), the present inventor examined three different combinations identified by (top, black), (top, side) and (top, below). Here "top" and "side" and "below" refer to the three gray transmitters in FIG. 4, whereas "black" points to the black transmitter at the far right in FIG. 4.

As an exemplary system implementation, the present inventor used orthogonal frequency division multiplexing (OFDM) with quadrature phase shift keying (QPSK) and convolutional coding to transmit two data sets simultaneously, using two transmitters. It will be understood that various types of other modulations and coding and signaling and demodulation and decoding and detection methods can also be used.

In some embodiments, modulation may include, but is not limited to, angular modulation, phase modulation (herein referred to as PM), frequency modulation (herein referred to as FM), amplitude modulation (herein referred to as AM), single-sideband modulation (herein referred to as SSB), single-sideband suppressed carrier modulation (herein referred to as SSB-SC), vestigial-sideband modulation (herein referred to as VSB), sigma-delta modulation, phase-shift keying (herein referred to as PSK), frequency-shift keying (herein referred to as FSK), amplitude frequency-shift keying (herein referred to as AFSK), minimum-shift keying (herein referred to as MSK), Gaussian minimum-shift keying (herein referred to as GMSK), very minimum-shift keying (herein referred to as VMSK), binary phase-shift keying (herein referred to as BPSK), quadrature phase-shift keying (herein referred to as QPSK), offset or staggered phase-shift keying (herein referred to as SQPSK), π/4 quadrature phase-shift keying (herein referred to as π/4 QPSK), differential phase-shift keying (herein referred to as DPSK), amplitude-shift keying (herein referred to as ASK), on-off keying (herein referred to as OOK), quadrature amplitude modulation (herein referred to as QAM), continuous phase modulation (herein referred to as CPM), trellis coded modulation (herein referred to as TCM), polar modulation, pulse-code modulation, pulse-width modulation, pulse-amplitude modulation, pulse-position modulation, pulse-density modulation, space-time modulations (e.g., unitary, rotated constellation), multi-carrier methods such as OFDM, collaborative methods, and any other modulation systems known in the art or yet to be developed that achieve the same or similar functionality.

In an embodiment, a signal may be pre-processed (post-processed) at a transmitter (receiver) using one or multiple processing methods. Processing methods may include any signal processing methods known in the art or yet to be developed that achieve the same or similar functionality, such as equalization algorithms, pre-coding methods, spatial multiplexing, data multiplexing, spatial modulation, transmit and receive diversity techniques, coding and decoding methods, interference cancellation techniques, temporal and frequency processing, etc. For example, any known or yet to be developed digital and/or analog signal processing method may be used in an embodiment. Although a single-user communication system and method is discussed throughout this application, the inventive principles discussed herein are fully applicable to multi-user communication systems and networks. Examples of multi-user systems include, but are not limited to, space-time block codes for interference cancellation, code division multiple access (CDMA), direct sequence spread spectrum (DSSS), frequency hopping spread spectrum (FHSS), those that work based on channels codes, error corrections codes, etc., may be used by people of ordinary skill in the art, in conjunction with the embodiments described herein, maybe with some modifications, without departing from the spirit or scope of the present invention. The inventive principles discussed herein are fully applicable to networks of transmitter/receiver repeaters or relays or nodes, placed at various positions on a pipeline, for purposes such as, but not limited to, increasing transmission distance and communication range. Various relaying strategies such as, but not limited to, amplify-and-forward or decode-and-forward can be used in conjunction with the disclosed invention.

Algorithms utilized may include, but are not limited to, different types of single and multi-channels pre-coders and equalizers such as zero-forcing equalizer, a minimum mean square equalizer (herein referred to as MMSE), a decision-feedback equalizer, adaptive equalizers, turbo-equalizers, symbol-by-symbol and fractionally-spaced equalizers, with different types of training algorithms, and/or any processing algorithm used in the art or yet to be developed that achieve the same or similar functionality. In addition to these temporal equalization algorithms, space-time and space-frequency techniques may be used as well.

In some embodiments, one or more receive diversity techniques may be used to combine the measured signals including, but not limited to maximal ratio combiner, selection combiner, equal gain combiner, and/or any other techniques known in the art or yet to be developed that achieve the same or similar functionality. A combination of sensors such as, but not limited to, accelerometers and strain sensors, can be used together with the disclosed invention. Different sensor types may provide diversity and different propagation channel characteristics, e.g., different impulse responses, different frequency responses, less frequency-selective or more frequency-selective channels, uncorrelated or less correlated channels, etc., that may help with improved communication performance and/or communication rate and/or communication range. Combination of different sensor types may also help with power and energy saving, i.e., achieving the same or better communication performance and/or communication rate and/or communication range at lower SNRs.

In some embodiments, one or more transmit diversity techniques may be used to add redundancy to the field components including, but not limited to, space-time coding, space-frequency coding, space-time-frequency coding, delay diversity, and/or any other techniques known in the art or yet to be developed that achieve the same or similar functionality.

When there are several transmitters for data transmission, one may use all possible space-time or space-time-frequency codes, which may offer, including but not limited to, coding gain, and/or diversity gain and/or multiplexing gain, and/or may achieve some optimal or non-optimal tradeoffs such as, but not limited to, diversity-multiplexing tradeoff, etc. Examples of such methods are, but not limited to, tilted-QAM code that achieves the optimal diversity-multiplexing tradeoff curve for multiple antenna channels, Golden code, $B_{2,\varphi}$ code which is a full diversity and full rate space-time code (a special case of Threaded Algebraic Space-Time (TAST) code), (' code which is less complex than Gold code and provides a higher coding gain than titled-QAM code as well as the TAST code, unitary matrix design, FRFD space-time code which provides a higher coding gain than Gold code and titled-QAM code, etc.

An embodiment includes utilizing a decoding method determined by the code used at the source. The codes used at the source may be source codes (e.g., data compression), channel codes (e.g., temporal codes, space-time codes, space-time-frequency codes), joint source-channel codes, encryption codes, and/or any other methods known in the art or yet to be developed that achieve the same or similar functionality. Further, some embodiments include a processing method capable of performing carrier and/or bit and/or frame synchronization.

Some embodiments include processing methods occurring at the transmitter (receiver). In alternate embodiments, one or more processing devices may be positioned proximate to the transmitting (receiving) device. For example, in an Orthogonal Frequency Division Multiplexing (herein referred to as OFDM) system, inverse fast Fourier transform, herein referred to as IFFT, and fast Fourier transform, herein referred to as FFT blocks/modules are needed at the transmitter and receiver, respectively. In another example, transmitting a spread spectrum signal (e.g., code division multiple access, direct sequence, or frequency hopping) for low-probability of interception communication and/or multi-user communication may create a need for a spreading module at the transmitter and a despreading module at the receiver for certain embodiments.

A communication system may include single-input single-output systems (herein referred to as SISOs), single-input multiple-output systems (herein referred to as SIMOs), multiple-input single-output systems (herein referred to as MISOs), and multiple-input multiple-output systems (herein referred to as MIMOs).

Conveyed data may include voice, video, text, numbers, characters, images, control and command signals, telemetry signals, and/or other outputs from devices used to convert physical quantities into data communication symbols. Data capable of being conveyed include, but are not limited to, any information, which may be encoded in acoustic, sonic, ultrasonic or subsonic waves or mechanical vibrations. For example, a transducer or actuator may be used to convert a data package (e.g., electrical signal) into pressure, stress, motion or force, and a receiver may reconvert the pressure, stress, motion or force back into electrical waveform.

The invention is applicable to various types of noise and/or interference and/or reverberation, such as, but not limited to, Gaussian, non-Gaussian, additive, multiplicative, stationary, non-stationary, cyclo-stationary, white, colored, narrowband, wideband, ambient, non-ambient, man-made, structure-borne, flow, surface-generated, acoustic, and non-acoustic noise, etc.

For data recovery at the receive side using the three sensors shown in FIG. 5, the present inventor used an optimal maximum likelihood (ML) detector. It will be understood that various types of other detectors and equalizers, such as, but not limited to, zero-forcing (ZF), minimum-mean-squared-error (MMSE), adaptive, turbo, and fractionally-spaced equalizers, and other detection and decoding algorithms, e.g., sphere detection or decoding, Viterbi decoding, hard or soft decoding, etc., can be used as well. The center frequency and bandwidth in the present experiments are 6 kHz and 4 kHz, respectively.

Figure 6:
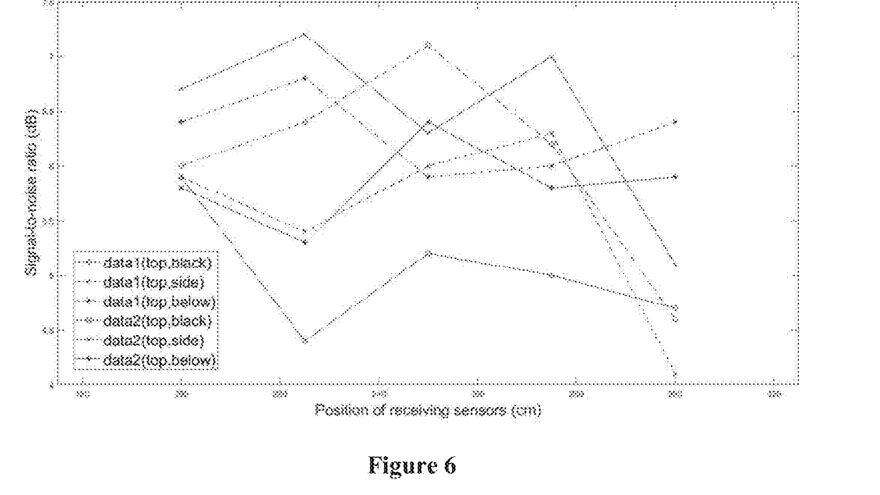
FIG. 6 is a graph showing signal-to-noise ratios (SNRs) for two data sets "data1" and "data2" transmitted simultaneously using two out of four transmitters in FIG. 4, to double the transmission rate. Labels in the legend box determine what pair of transmitters in FIG. 4 is used. The horizontal axis specifies positions of the receiving sensors in FIG. 5 with respect to the transmitters; and, FIG. 7 is a graph showing bit error rates (BERs) for two data sets "data1" and "data2" transmitted simultaneously using two out of four transmitters in FIG. 4, to double the transmission rate. Labels in the legend box determine what pair of transmitters in FIG. 4 is used. The horizontal axis specifies positions of the receiving sensors in FIG. 5 with respect to the transmitters.
Figure 7:
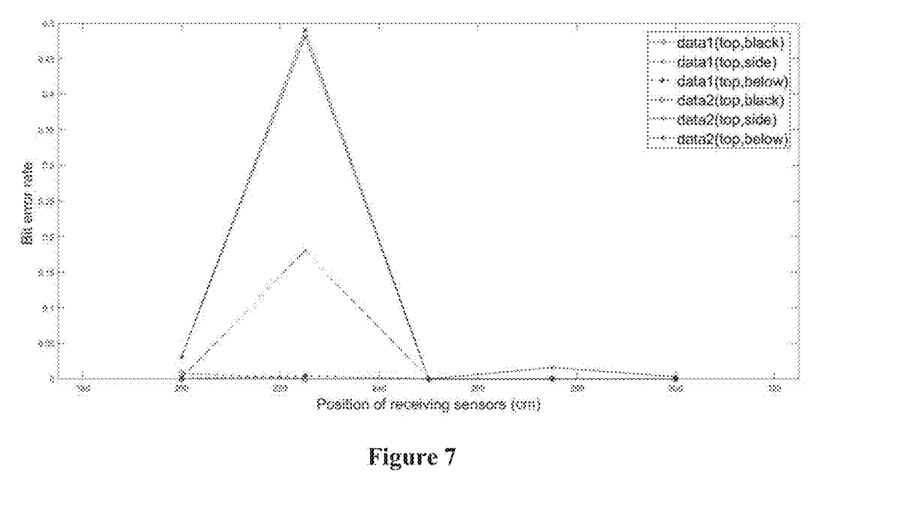
Figure 8:
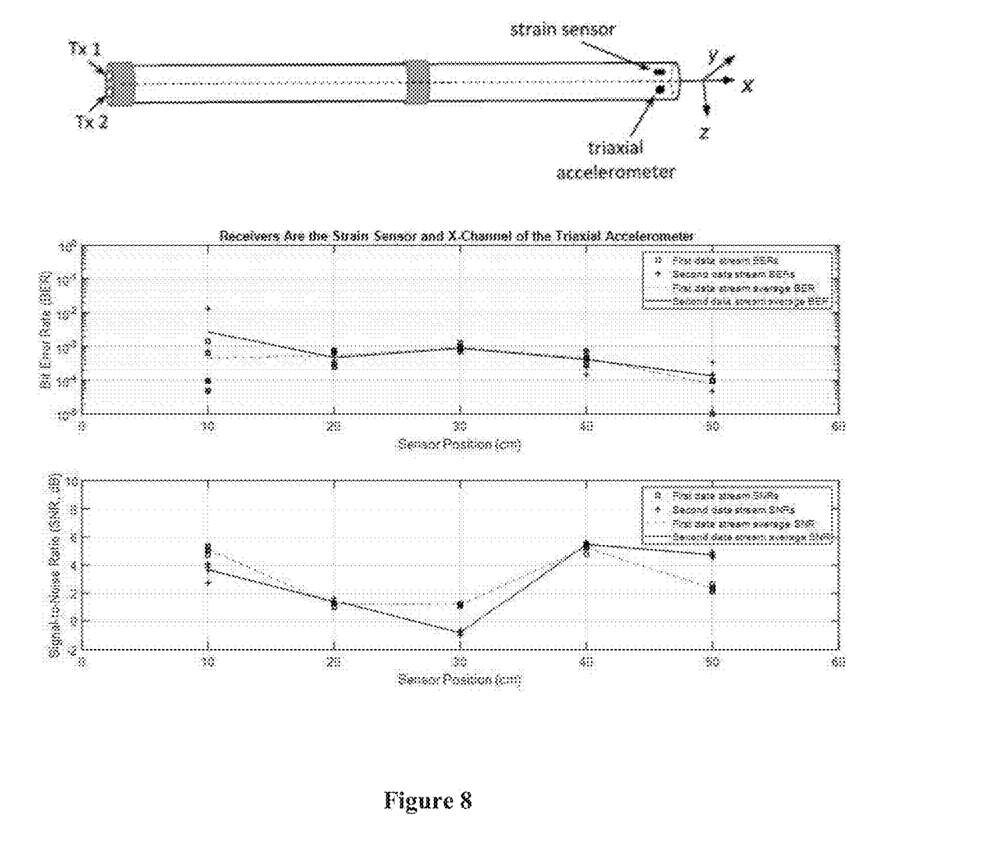
FIG. 8 includes a schematic drawing of a testbed (top), and graphs showing BERs (middle) and SNRs (bottom) at different receiver positions, with two actuators transmitting two data streams simultaneously. The receivers were a strain sensor and the x-channel of a triaxial accelerometer. The piecewise linear graphs represent average BERs and SNRs for each of the two data streams versus the receiver position.
Figure 9:
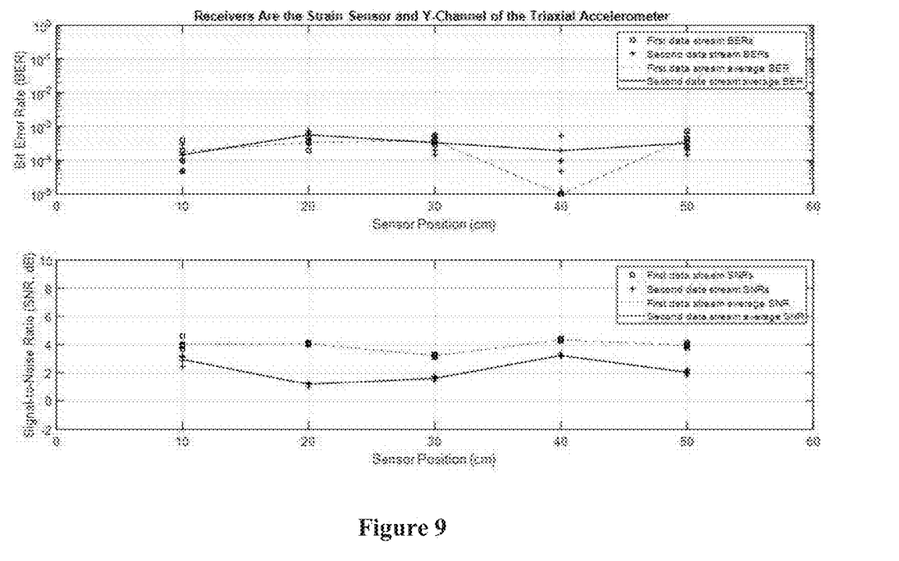
FIG. 9 are graphs showing BERs (top) and SNRs (bottom) at different receiver positions, with two actuators transmitting two data streams simultaneously. The receivers were a strain sensor and the y-channel of a triaxial accelerometer. The piecewise linear graphs represent average BERs and SNRs for each of the two data streams versus the receiver position.
Figure 10:
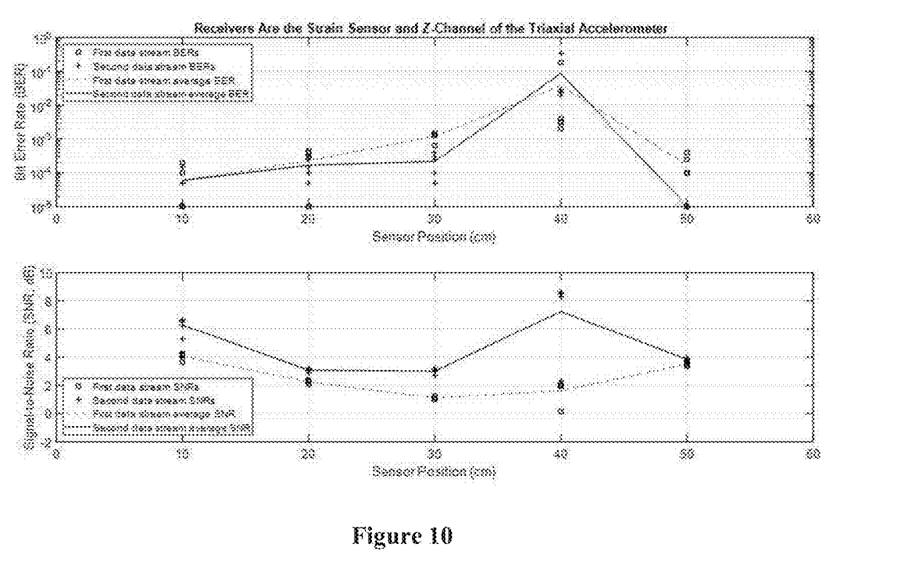
FIG. 10 are graphs showing BERs (top) and SNRs (bottom) at different receiver positions, with two actuators transmitting two data streams simultaneously. The receivers were a strain sensor and the z-channel of a triaxial accelerometer. The piecewise linear graphs represent the average BERs and SNRs for each of the two data streams versus the receiver position.
Figure 11:
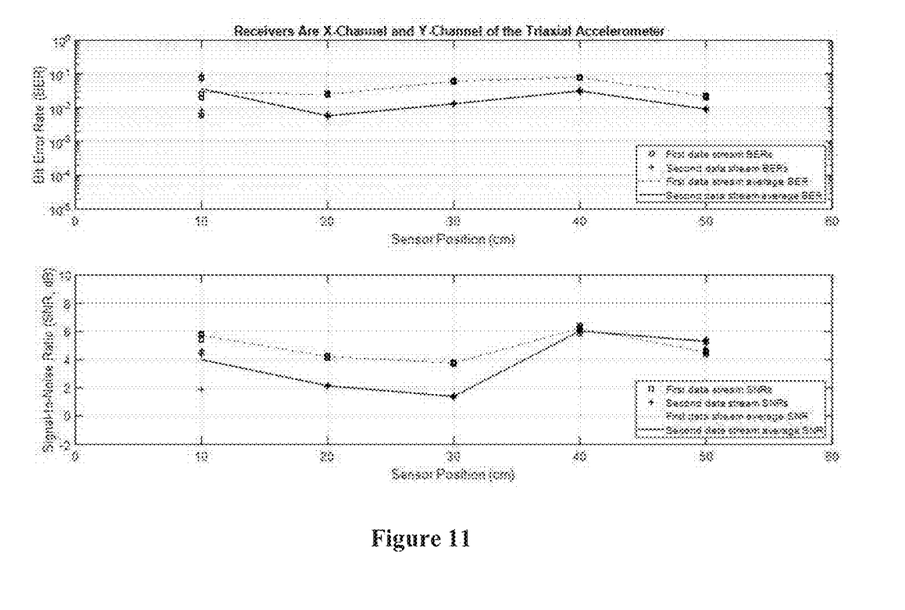
FIG. 11 are graphs showing BERs (top) and SNRs (bottom) at different receiver positions, with two actuators transmitting two data streams simultaneously. The receivers were the x-channel and y-channel of a triaxial accelerometer. The piecewise linear graphs represent average BERs and SNRs for each of the two data streams versus the receiver position.
Figure 12:
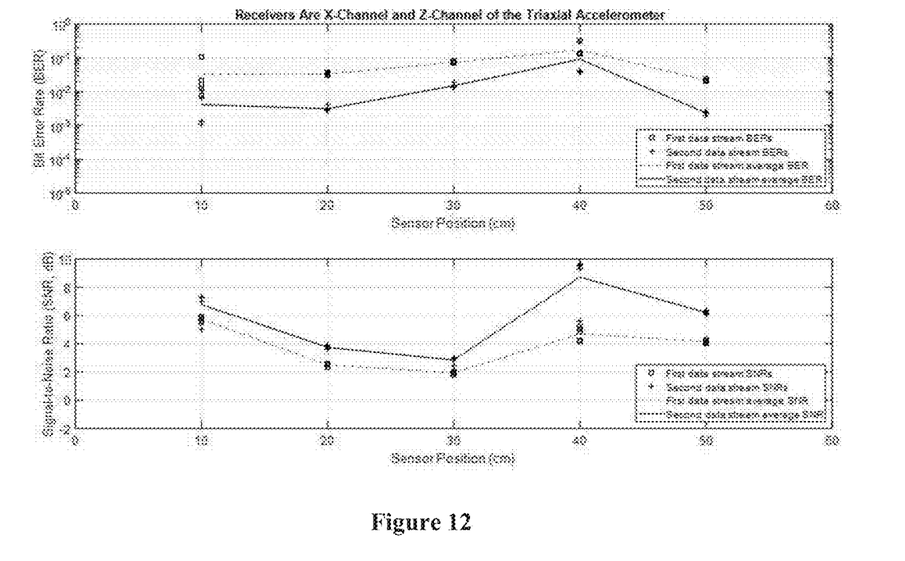
FIG. 12 are graphs BERs (top) and SNRs (bottom) at different receiver positions, with two actuators transmitting two data streams simultaneously. The receivers were the x-channel and z-channel of a triaxial accelerometer. The piecewise linear graphs represent the average BERs and SNRs for each of the two data streams versus the receiver position.
Figure 13:
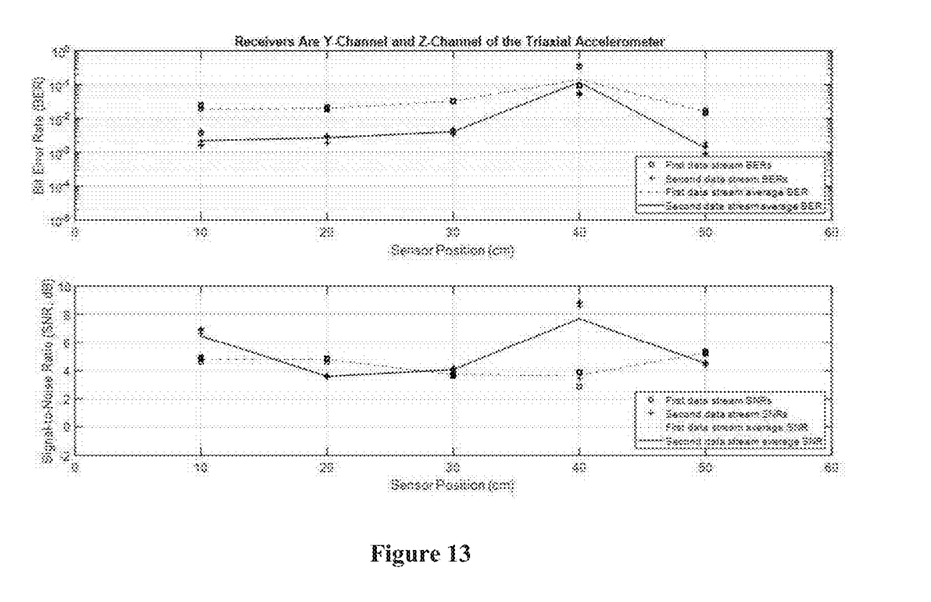
FIG. 13 are graphs showing BERs (top) and SNRs (bottom) at different receiver positions, with two actuators transmitting two data streams simultaneously. The receivers were the y-channel and z-channel of a triaxial accelerometer. The piecewise linear graphs represent the average BERs and SNRs for each of the two data streams versus the receiver position.

Results of the experiments with three different transmitter pairs (top, black), (top, side) and (top, below) are listed in Table 1 (see below) and graphed in FIG. 6 and FIG. 7, with the receiving sensors in FIG. 5 being placed at various distances from the transmitters. Table 1 shows signal-to-noise ratios (SNRs) and BERs for two data sets "data1" and "data2" transmitted simultaneously using two out of four transmitters in FIG. 4, to double the transmission rate. The first column specifies what pair of transmitters in FIG. 4 is used. FIG. 6 and FIG. 7 present SNR and BER graphs for the two data sets, respectively.

TABLE 1

| Transmitters | Receivers positions(cm) | SNR 1 (dB) | BER 1 | SNR 2 (dB) | BER 2 |
|---|---|---|---|---|---|
| (top, black) | 200 | 6 | 0.0079 | 5.9 | 0 |
| (top, black) | 225 | 6.4 | 0.00058 | 4.4 | 0.00024 |
| (top, black) | 250 | 7.1 | 0.00029 | 5.2 | 0.00043 |
| (top, black) | 275 | 6.2 | 0.00039 | 5 | 0.00063 |
| (top, black) | 300 | 4.6 | 0.00019 | 4.7 | 0.00058 |
| (top, side) | 200 | 5.9 | 0.0017 | 6.7 | 0.031 |
| (top, side) | 225 | 5.4 | 0.18 | 7.2 | 0.48 |
| (top, side) | 250 | 6 | 0 | 6.3 | 0 |
| (top, side) | 275 | 6.3 | 0.00019 | 7 | 0.016 |
| (top, side) | 300 | 4.1 | 0.00063 | 5.1 | 0.0032 |
| (top, below) | 200 | 6.4 | 0.00024 | 5.8 | 0.031 |
| (top, below) | 225 | 6.8 | 0.0042 | 5.3 | 0.49 |
| (top, below) | 250 | 5.9 | 0 | 6.4 | 0 |
| (top, below) | 275 | 6 | 0 | 5.8 | 0 |
| (top, below) | 300 | 6.4 | 0 | 5.9 | 0.00029 |

The present inventor observed that for the (top, black) transmitter pair, BERs of the two data streams data1 and data2 are very small for all the receiver positions. BERs for the other two transmitter pairs are generally very small as well, except for one receiver position.

Overall, these exemplary implementations of the disclosed method and system demonstrate how one can increase the transmission rate for communication and telemetry in sequences of solid pieces, such as, but not limited to, connected pipes or ducts or tubings in a variety of applications.

Referring now to FIGS. 8-13, the transmitters transmit two different sets of data simultaneously and with approximately the same power over approximately the same bandwidth of 2 to 6 kHz. More specifically, each actuator transmitted fifty OFDM symbols in a row, repeated five times in order to have multiple trials. This simultaneous transmission of two data streams doubled the transmission rate, without any bandwidth increase. To separate and demodulate the two data streams at the receive side, two receiving sensors were used in the experiments: the strain sensor and the triaxial accelerometer. Since the latter had the three x, y, and z acceleration channels, there were six possible receiver configurations using two channels: strain and x-acceleration, strain and y-acceleration, strain and z-acceleration, x-acceleration and y-acceleration, x-acceleration and z-acceleration, and y-acceleration and z-acceleration. For each receiver at each position, five BERs, five SNRs, and their averages for each of the first and the second data streams are provided, as obtained from five trials.

To compare performance of these six 2×2 systems with two transmitting actuators and a two-channel receiver, the best performance of a one actuator system was considered as a benchmark. Table 2 lists average BERs and SNRs of various receiving sensors, with one actuator transmitting one data stream. The lowest average BER in Table 2 is below $10^{-3}$ for the system with the strain receiver, for average SNR less than 4 dB. It is observed in Table 2 that the BER of the strain sensor receiver is smaller than the BERs of the accelerometer receivers. This can be attributed to the relatively flat strain channel frequency response, which rendered equalization and data detection more accurate than the frequency-selective and non-flat acceleration channels' frequency responses.

TABLE 2

| Receiving Sensor | BER | SNR (dB) |
|---|---|---|
| Strain | $2.7 \times 10^{-4}$ | 2.4 |
| X-Acceleration | $2.2 \times 10^{-3}$ | 5.2 |
| Y-Acceleration | $1.1 \times 10^{-3}$ | 6.5 |
| Z-Acceleration | $3.5 \times 10^{-3}$ | 5.5 |

The two-actuator system using the strain and the y-acceleration receivers offered the best performance among the six two-actuator systems. This is because in all the receiver positions, its average BERs were less than $10^{-3}$, with average SNRs close to or less than 4 dB (these are the benchmark values mentioned in the previous paragraph). The second-best two-actuator system appeared to be the one which utilized the strain and the x-acceleration receivers.

Note that average BERs of the two-actuator systems that did not use the strain sensor receiver were all greater than $10^{-3}$ at all positions, for average SNRs ranging from 1.5 to 9 dB. This can be related to the relatively flatter strain channel frequency response, which made equalization and data detection simpler and more accurate compared to the non-flat and frequency-selective behavior of the acceleration channels.

The measurement results averaged over five different receiver positions and over two data streams are provided in Table 3. It was observed that when the strain sensor was one of the receivers, the BER tended to be smaller. This held true even for strain and z-acceleration in Table 3, if the abnormally high BERs for this receiver pair at 40 cm were not included in the average, which updated the BER and SNR for this receiver pair in Table 3 to $2.6 \times 10^{-4}$ and 3.4 dB, respectively. Overall, these smaller BERs can be attributed to the relatively flat strain channel frequency response, which made data recovery and equalization simpler and more effective, compared to the acceleration channels which were non-flat and more frequency selective.

TABLE 3

| Receiving Sensor Pair | BER | SNR (dB) |
|---|---|---|
| Strain and x-acceleration | $7.1 \times 10^{-4}$ | 3.0 |
| Strain and y-acceleration | $2.9 \times 10^{-4}$ | 3.1 |
| Strain and z-acceleration | $1.3 \times 10^{-2}$ | 3.6 |
| x- and y-acceleration | $3.1 \times 10^{-2}$ | 4.3 |
| x- and z-acceleration | $4.5 \times 10^{-2}$ | 4.7 |
| y- and z-acceleration | $3.6 \times 10^{-2}$ | 4.9 |

Figure 14:
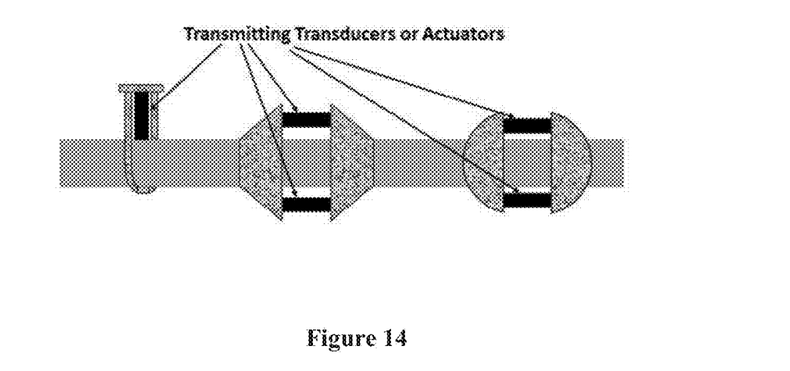

FIG. 14 is a drawing showing some exemplary ways of mounting one or more transmitters, such as, but not limited to, transducers and actuators, on a pipe. In the left drawing, a U-bolt is used to mount at least one transmitter. In the middle drawing, at least two transmitters are sandwiched between two cone-shaped holders, with the holders surrounding and attached to the pipe. Exemplary linear smooth transition of the cross section of each holder helps with better and more efficient transmission of signals and vibrations from the transmitters to the pipe. The right drawing is another exemplary way of mounting at least two transmitters, where cross-sections of the two holders change in a non-linear manner. The two holders in a holder pair do not need to have the same shape and do not need to be made from the same materials. Another exemplary way to mount transmitter(s) is to place the exemplary stacks of piezoelectric or piezoceramic disk segments, shown in FIG. 2, between an exemplary holder pair shown in FIG. 14.

Figure 15:
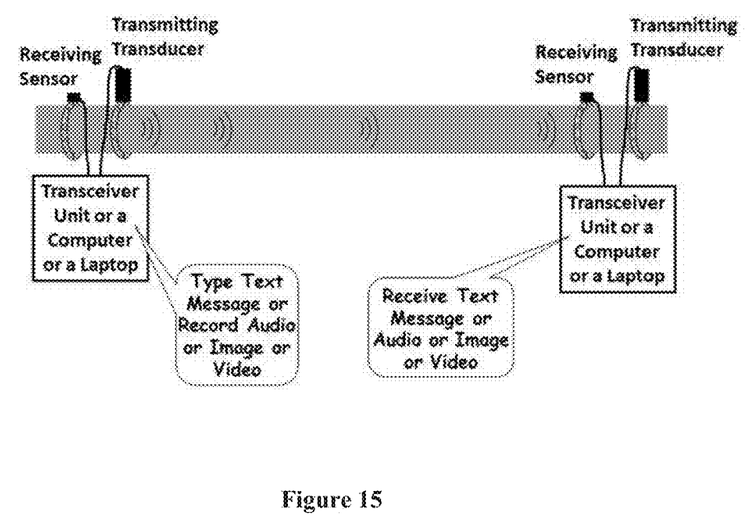
FIG. 15 is a schematic drawing that shows two transmitting/receiving units used for communication through an infrastructure, such as a pipeline running in a tunnel of an underground mine.

FIG. 15 is a schematic drawing that shows two transmitting/receiving units used for communication through an infrastructure, such as a pipeline running in a tunnel of an underground mine. The mounting rings are exemplary tools and methods, and other tools and methods such as those disclosed in FIG. 15 can be used.

Figure 16:
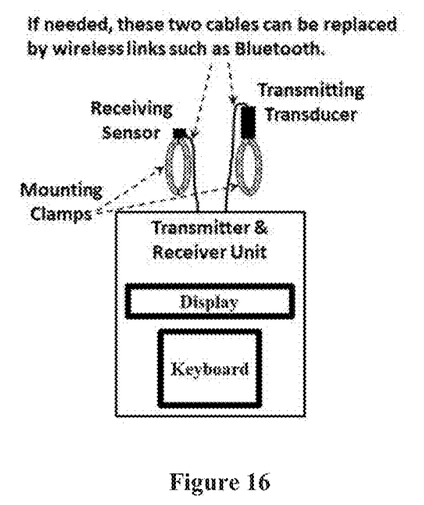
FIG. 16 shows some exemplary details of a transceiver unit disclosed in FIG. 15.

FIG. 16 shows some exemplary details of a transceiver unit disclosed in FIG. 15. The unit may include the following components:

A keypad or keyboard to type in text messages,
A display (LCD, LED, etc.) to show typed text messages and received text messages, or images or videos,
Microphone and/or speaker and/or camera,
A casing with the keypad, display, and/or microphone and/or speaker and/or camera, transmitter and receiver electronics, and a battery,
Transmitting transducer(s) equipped with a proper mounting tool, e.g., FIG. 14 tools or the clamp in FIG. 16, which allow the transducer(s) to be securely attached to a pipe (manual attachment, i.e., pressing the transducer against the pipe, is also possible),
Receiving sensor(s) equipped with magnet or clamp or other mounting mechanisms, to attach to a pipe,
The transmitting transducer(s) and receiving sensor(s) may be connected to the casing using cables. A wireless connection such as Bluetooth may replace the two cables.

As an example of how the system works, consider sending a text message. To send a message using the exemplary unit in FIG. 16 via a pipeline, a mineworker types in the message using the keypad. The transmitting transducer attached to the pipeline converts the typed message to acoustic waves, which travel through the body of the pipeline. These waves are received and converted back to text, by the receiving sensor of another mineworker who is using his own unit, to receive text messages from that pipeline, on the display of his own unit.

It is noted that the method and system described thus far and/or described later in this document may be achieved by utilizing any of the known technologies, such as standard digital circuitry, analog circuitry, any of the known processors that are operable to execute software and/or firmware programs, programmable digital devices or systems, programmable array logic devices, field programmable gate arrays (FPGAs), DSP (digital signal processing) processors, software-defined communication technologies and platforms, network-defined communication technologies and platforms, or any combination of the above. One or more embodiments of the invention may also be embodied in a software program for storage in a suitable storage medium and execution by a processing unit.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

REFERENCES CITED

1 L. Camwell, J. G. McRory and J. M. Neff, "Acoustic telemetry, with multiple nodes in drillstring, used to achieve distributed MWD," *Drilling Contractor*, pp. 30-35, 2009.
2. K. M. Joseph and B. Kerkez, "Enabling communications for buried pipe networks," in *Proc. World Environmental and Water Resources Congress,* 2014, pp. 1-12.
3. E. Zhang and A. Abdi, "Communication rate increase in drill strings of oil and gas wells using multiple actuators," Sensors, vol. 19, 1337, 2019.
4. https://electrical-engineering-portal.com/understanding-underground-electric-transmission-cables

What is claimed is:

1. A method of communication through a substantially solid medium, comprising:
generating data using at least one input communicatively coupled to two or more transmitters;
transmitting the data using the two or more transmitters, wherein the two or more transmitters are coupled to the substantially solid medium; and
receiving the data using at least two receivers, wherein:
the at least two receivers are coupled to the substantially solid medium,
communication channels between the two or more transmitters and the at least two receivers are in approximately a same common bandwidth, and
the at least two receivers comprise different types of sensors providing different responses, to demodulate the data.

2. The method of claim 1, wherein the data is broken up into two or more transmission segments.

3. The method of claim 2, wherein:
the two or more transmitters comprise a first transmitter and a second transmitter, and
the transmitting the data comprises:
transmitting a first transmission segment or a combination of two or more transmission segments of the data using the first transmitter; and
transmitting a second transmission segment or a combination of two or more transmission segments of the data using the second transmitter.

4. The method of claim 1, further comprising using the two or more transmitters to produce extensional waves, flexural waves, or torsional waves, or combinations thereof.

5. The method of claim 1, wherein the substantially solid medium is a length of piping, composed of one or more pipes.

6. The method of claim 1, further comprising pre-processing the data prior to transmission by the two or more transmitters.

7. The method of claim 1, further comprising post-processing received data using the at least two receivers.

8. The method of claim 1, wherein the two or more transmitters are mounted to, on, or attached to the substantially solid medium.

9. A system for communication through a substantially solid medium, comprising:
two or more transmitters configured to transmit data, wherein the two or more transmitters are coupled to the substantially solid medium;
at least two receivers configured to receive the data, wherein the at least two receivers are coupled to the substantially solid medium;

at least one input communicatively coupled to the two or more transmitters,
wherein:
the data is generated by the at least one input,
communication channels between the two or more transmitters and the at least two receivers are in approximately a same common bandwidth, and
the at least two receivers comprise different types of sensors providing different responses, to demodulate the data.

10. The system of claim 9, wherein the two or more transmitters comprise two or more acoustic transmitters or two or more electromechanical transducers.

11. The system of claim 10, wherein the two or more electromechanical transducers are configured to produce extensional waves, flexural waves, or torsional waves, or combinations thereof.

12. The system of claim 10, wherein:
the two or more electromechanical transducers comprise a first electromechanical transducer and a second electromechanical transducer,
the first electromechanical transducer is configured to produce a first wave form comprising one or more of:
an extensional wave; a flexural wave; or a torsional wave, and
the second electromechanical transducer is configured to produce a second wave form comprising one or more of:
an extensional wave; a flexural wave; and a torsional wave.

13. The system of claim 12, wherein:
the data comprises one or more measured parameters, and
the one or more measured parameters comprise one or more of: temperature, pressure, torque, humidity, a text based message, an image based message, an audio message, and a video message.

14. The system of claim 10, wherein the two or more electromechanical transducers belong to a group of transmitters comprising one or more of:
piezoelectric transducers, piezoceramic transducers, magnetostrictive transducers, capacitive transducers, inductive transducers and transducers comprising one or more inductive materials.

15. The system of claim 9, wherein:
the at least two receivers comprise a first receiver and a second receiver,
the first receiver comprises one or more sensors selected from the following:
single-channel (single-axis) accelerometers, multi-channel (multi-axes) accelerometers, and strain sensors,
the second receiver comprises one or more sensors selected from the following:
single-channel (single-axis) accelerometers, multi-channel (multi-axes) accelerometers, and strain sensors, and
a sensor of the first receiver is different from a sensor of the second receiver.

16. A system for communication through a substantially solid medium, comprising:
a plurality of electromechanical transducers configured to transmit data,
wherein:
at least one electromechanical transducer, of the plurality of electromechanical transducers, is mounted on the substantially solid medium via a first mounting apparatus, and
the at least one electromechanical transducer, of the plurality of electromechanical transducers, is configured to produce a first wave form comprising one or more of:
extensional waves, flexural waves, and torsional waves;
at least two receivers configured to receive the data,
wherein:
at least one of the at least two receivers is mounted on the substantially solid medium via a second mounting apparatus,
communication channels between the plurality of electromechanical transducers and the at least two receivers are in approximately a same common bandwidth, and
the at least two receivers comprise different types of sensors providing different responses; and
at least one communication unit communicatively coupled to one or more of: the plurality of electromechanical transducers and the at least two receivers,
wherein the at least one communication unit comprises one or more of: at least one input; and at least one output.

17. The system of claim 16, wherein the at least one communication unit is wirelessly coupled to one or more of: at least one electromechanical transducer of the plurality of electromechanical transducers and the at least one of the at least two receivers.

18. The system of claim 16, wherein the at least one input comprises at least one touch sensitive surface.

19. The system of claim 16, wherein the first mounting apparatus comprises a first securement mechanism and a second securement mechanism.

20. The system of claim 16, wherein the at least one output comprises at least one display.

* * * * *